United States Patent
Hooper, III et al.

(10) Patent No.: US 7,295,352 B2
(45) Date of Patent: Nov. 13, 2007

(54) SCANNING APPARATUS

(75) Inventors: Howard Gaines Hooper, III, Boise, ID (US); Curtis Gregory Kelsay, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 908 days.

(21) Appl. No.: 10/154,311

(22) Filed: May 23, 2002

(65) Prior Publication Data
US 2003/0218782 A1 Nov. 27, 2003

(51) Int. Cl.
*H04N 1/04* (2006.01)
(52) U.S. Cl. ...................... 358/474; 358/497
(58) Field of Classification Search ............. 358/473, 358/472, 474, 497, 494, 487, 482, 483, 505, 358/506, 512–514, 498; 382/313, 312, 318, 382/319; 399/211, 212; 250/234–236, 208.1, 250/216, 239; 348/139, 142, 50, 82, 86, 348/92, 94, 722
See application file for complete search history.

(56) References Cited
U.S. PATENT DOCUMENTS

| | | | | |
|---|---|---|---|---|
| 4,943,821 A | * | 7/1990 | Gelphman et al. ............ 396/24 |
| 5,145,432 A | * | 9/1992 | Midland et al. ................ 445/3 |
| 5,583,662 A | * | 12/1996 | Takahashi et al. .......... 358/474 |
| 5,711,227 A | * | 1/1998 | Johnson ....................... 104/126 |
| 5,818,610 A | * | 10/1998 | Bromley et al. ............ 358/474 |
| 6,028,682 A | * | 2/2000 | Ott et al. ..................... 358/497 |
| 6,084,691 A | * | 7/2000 | Tsai et al. ................... 358/474 |
| 6,330,084 B1 | * | 12/2001 | Chiang ........................ 358/474 |
| 6,435,421 B1 | * | 8/2002 | Peterson ................... 238/10 R |
| 6,557,775 B1 | * | 5/2003 | Brinson et al. ........... 238/10 R |
| 7,089,867 B2 | * | 8/2006 | Nilsen ......................... 104/7.1 |

* cited by examiner

*Primary Examiner*—Cheukfan Lee

(57) ABSTRACT

Apparatus for performing optical scanning functions, wherein the apparatus includes an exterior scan module to facilitate a compact size. That is, the scanning apparatus in accordance with the present invention is made smaller by way of a deployable guide track and an external scan module that is configured to be guided by, and to move relative to, the guide track while performing scanning functions. The guide track can be configured to be extendable and/or retractable from a base unit that can also be included in the apparatus. The guide track can thus be coiled when retracted, or alternatively, can be foldable, or telescopic.

18 Claims, 4 Drawing Sheets

SCANNING APPARATUS

FIELD OF THE INVENTION

The invention claimed and disclosed herein pertains to optical scanning apparatus and more specifically, to compact optical scanning apparatus.

BACKGROUND OF THE INVENTION

Optical scanning devices are well known in the art. An optical scanning device is configured to convert visual data into digital electronic data. For example, an optical scanning device ("scanning device") can optically scan a visual document, such as a letter, to thereby generate a set of electronic data (typically in a digital format) which is representative of the original, visual, document (the "hard copy"). This digital electronic data can then be stored, transmitted, or used in some other way.

Scanning devices are employed in a wide array of applications. For example, some scanning devices are employed solely for scanning while other scanning devices are employed in conjunction with additional devices and operations. For example, some scanning devices are produced as stand-alone devices used solely for scanning, while other scanning devices are integrated with additional devices such as facsimile machines, copiers, and the like, wherein the scanning operation is integrated with additional operations and/or processes such as data signal transmission and/or with image-producing processes.

Various configurations of scanning devices exist in the art, including those known as flatbed scanners, sheet-fed scanners, handheld scanners, and drum scanners. One of the most popular scanning device configurations is the flatbed scanner. The flatbed type of scanning device is also known as a desktop scanner. Flatbed scanning devices generally employ a horizontal, flat, glass plate, or platen, that is typically located at the top of the scanning device. A scan head is operatively positioned beneath the glass plate and is configured to move back and forth under the platen between a position proximate one end of the platen and another position proximate the opposite end of the platen.

The hard copy document to be scanned is placed face down on the top of the platen. The scanning operation is then initiated and the scan head moved along the underside of the platen to thereby optically scan the document through the platen. The scanning head generally includes a light source. As the scan head is moved underneath and past the document, light from the light source passes through the platen and reflects off of light reflective portions of the document.

The light reflected from the document then passes back through the platen and is recorded by sensors (which are typically located in the scan head). The sensors are typically configured to generate signals in response to detecting the reflected light. The signals are received by a processor or the like to create an electronic image (typically in the form of a digital file) that is representative of the object being scanned.

The size of the platen on a flatbed scanning device must be at least as large as the largest document or portion thereof that is to be scanned in a single pass of the scan head. Thus, most flatbed scanning devices have platens with dimensions of at least eight-and-one-half inches by eleven inches (approximately 21.6 cm by 27.8 cm) so that a standard sheet of paper can be scanned. In many cases, the platen of prior art scanning devices is at least slightly larger than the size of a standard sheet of paper so that oversize sheets can be scanned.

Generally, the scannable area below the platen must be substantially "clear" of obstructions and the like in order to permit the scan head to sweep the entire scannable area of the platen during the scanning process. Additionally, a chassis or frame or the like generally surrounds the periphery of the platen for structural support thereof as well as for structural support of the scan head and related components such as those employed for moving the scan head back and forth from one end of the platen to the other. Moreover, a skin or outer body or the like is employed to protect the internal components of the scanning device. Thus, the "foot print" of a given platen and related components on a typical flatbed scanner can be considerably larger than the largest scannable area of the given platen.

Typically, the scanning device also includes a removable cover which is used to cover the platen during a scanning process. The cover reduces the intrusion of ambient light into the scanner during the scanning process and helps to hold the document in a stationary position in contact with the platen during the scanning process. More importantly, the cover is typically configured to provide a reflective surface adjacent to the platen so that scannable areas of the platen which are not covered by a document during a scanning process will be generated as white areas on the resulting image. This results in a more visually appealing image, and also reduces the consumption of the toner or ink used to generate the image.

Thus, because of the required size of the platen and related components, the size and/or the "footprint" of typical prior art flatbed scanning devices can be significantly large. That is, the size and/or footprint of prior art flatbed scanning devices is dictated by the size of the "bed" of the scanning device which includes the platen, the cover, the surrounding support structure and motive components, and the body, even though the size of the actual components of a typical prior art flatbed scanning device are relatively small compared to the "swept area" which must be maintained for movement of the scan head during the scanning process.

What are needed then, are scanning apparatus that achieve the benefits to be derived from similar prior art methods and/or devices, but which avoid the shortcomings and detriments individually associated therewith.

SUMMARY OF THE INVENTION

The present invention provides for optical scanning apparatus that include a deployable guide track and an external scan module to facilitate reduction in the size of the apparatus. The external scan module is configured to scan a scannable object such as a hard copy document or the like while being guided by, and moving relative to, the deployable guide track. The guide track can be either separate from, or connected to, a base unit which can also be included in the scanning apparatus. The deployable guide track can be extendable and retractable relative to the base unit.

Further move, the deployable guide track can be configured to be coiled so as to be extendable/retractable. Alternatively, the guide track can be foldable, or can be telescopic. The external scan module can be configured to be supported on and above the guide track while moving relative thereto and while performing scanning functions, wherein the guide track can be configured to be supported on a work surface. Alternatively, the scan module can be configured to be supported from, and below, the guide track which is correspondingly elevated and configured to be substantially rigid and supported above the work surface.

These and other aspects and embodiments of the present invention will now be described in detail with reference to the accompanying drawings, wherein:

DETAILED DESCRIPTION OF THE INVENTION

Apparatus in accordance with the present invention are configured to perform optical scanning functions while also providing a compact optical scanning apparatus configuration to minimize storage and/or shipping resources associated with the scanning apparatus. In accordance with one embodiment of the present invention, a scanning apparatus includes a deployable guide track and an external scan module configured to move relative to the guide track while performing scanning functions and being guided by the guide track.

In accordance with another embodiment of the present invention, a scanning apparatus includes a pair of parallel, spaced-apart, deployable guide tracks configured to rest on a work surface. An external scan module is configured to move relative to the pair of guide tracks while performing scanning functions and while guided by, and supported on and above, the pair of guide tracks. The apparatus can also include a base unit configured to rest on the work surface, and to which the deployable guide tracks can be connected, and from which the guide tracks can be extendable.

In accordance with yet another embodiment of the present invention, a scanning apparatus includes a pair of rigid, parallel, spaced-apart, deployable guide tracks configured to be elevated above a work surface. An external scan module is included, and is configured to move relative to the guide tracks, and to perform scanning functions while guided by, and suspended from and below, the pair of guide tracks. The apparatus can also include a base unit configured to rest on the work surface, and to which base unit the guide tracks can be connected, and from which the guide tracks can be extendable.

Figure 1:
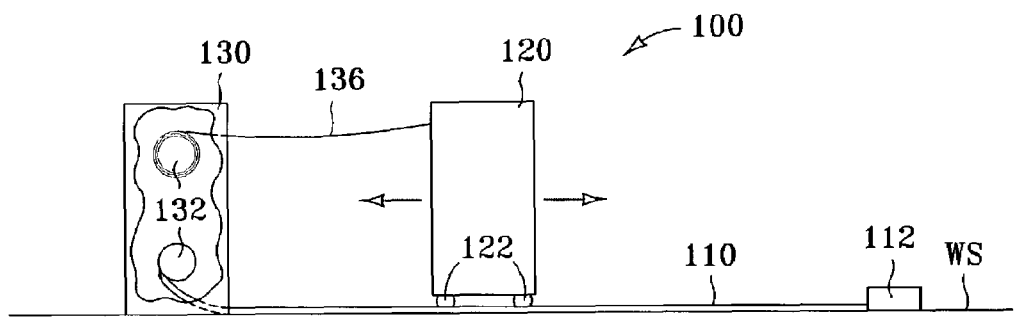
FIG. 1 is a side elevation view that depicts a scanning apparatus in accordance with one embodiment of the present invention.

Turning now to FIG. 1, a side elevation view is shown which depicts a scanning apparatus 100 in accordance with one embodiment of the present invention. The apparatus 100 is preferably configured to be supported on a work surface WS as shown. The work surface WS can be any surface that is suitable to support the apparatus 100 thereon. For example, the work surface WS can be a desk top, a table top, a shelf top, a floor, or the like. In some circumstances, as will be explained more fully below, it is preferable that the work surface WS is configured to reflect light in the visible spectrum. That is, in some cases, the work surface WS is preferably a light-reflective color, and more preferably white in color.

The scanning apparatus 100 comprises a deployable guide track 110 which will be discussed in greater detail below. As shown, the guide track 110 can be configured to rest on the work surface WS. The scanning apparatus 100 also includes an external scan module 120 that is configured to move relative to the guide track 110. The external scan module 120 is also configured to perform scanning functions while guided by the guide track 110. The term "external scan module" means a scan module that is not enclosed, or contained, by any structure, covering, or the like, relative to which the scan module moves during scanning functions. Thus, the external scan module 120 is contrasted with the prior art scan module (not shown) described above which is enclosed within a structure, covering, or the like, relative to which the prior art scan module moves during scanning functions.

Still referring to FIG. 1, and as mentioned above, the guide track 110 is configured to guide the scan module 120 during movement thereof in conjunction with the performance of scanning functions. The guidance of the scan module 120 by the guide track 110 can be accomplished in any of a number of possible manners. For example, the guide track 110 and the scan module 120 can be configured to contact one another in order for the guide track to provide guidance to the scan module. However, as will be explained below, the guide track 110 and the scan module 120 need not contact one another in order for the guide track to provide guidance to the scan module.

As shown in FIG. 1, the guide track 110 can be configured to support thereon the scan module 120. Moreover, the scan module 120 can be supported on, and above, the guide track 110. For example, the scan module 120 can comprise one or more rollers 122 that are configured to be supported on, and guided by, the guide track 110. Thus, the general operation of the guide track 110 and the scan module 120 with respect to the guidance thereof can be described as analogous to that of a railroad track and a railroad car (not shown), respectively. However, as will become apparent in later discussions of alternative embodiments of the present invention, such a railroad track analogy is not universally applicable.

As further shown in FIG. 1, the scanning apparatus 100 can comprise a base unit 130. Preferably, the base unit 130 is configured to rest on the work surface WS. The base unit 130 is also preferably configured to communicate with the scan module 120, wherein data signals are transmitted therebetween. That is, the scanning apparatus 100 can be configured so that the scan module 120 performs scanning functions and converts scan data, developed as the result of the scanning functions, into data signals which are preferably transmitted to the base unit 130. Thus, the base unit 130 is suitable for employment as an interface, or the like, between the scan module 120 and other devices or means (not shown) to which, and by which, the scan data is ultimately, or intermediately, transmitted.

For example, because the scan module 120 is configured to move while performing scanning functions, the stationary base unit 130, because of its stationary nature, can be better suited than the scan module for supporting power and/or communication terminals and/or connection points. The transmission of data signals and/or power and the like between the scan module 120 and the base unit 130 can be accomplished in any of a number of possible manners.

For example, the guide track 110 can be configured to convey data signals and/or power and the like between the scan module 120 and the base unit 130. This can be accomplished, for example, by incorporating an electrically conductive member (not shown) into the guide track 110, wherein data signals are conveyed between the scan module 120 and the base unit 130 by way of such an electrically conductive member.

As an alternative manner of conveying data signals and/or power between the scan module 120 and the base unit 130, the apparatus 100 can comprise a tether 136 that is connected between the base unit and the scan module as shown. The tether 136 is thus configured to convey data signals and/or power between the scan module 120 and the base unit 130. The tether 136 can comprise, for example, an electrically conductive data transmission wire or cable.

Alternatively, the tether 136 can comprise a fiber optic data transmission filament or cable. As a further alternative, known wireless data signal transmission means (not shown) can be employed to convey data signals between the scan module 120 and the base unit 130. Such wireless data signal transmission means can include, for example, infrared transmission means, radio wave transmission means, sound wave transmission means, and the like.

Preferably, the tether 136 is automatically extendable and retractable so as not to drag or become ensnared or entangled in the rollers 122 or the like. The tether 136 can be made retractable by the employment of a respective reel or spool 132 about which the tether can be coiled when retracted. The respective spool 132 can be operatively supported on the base unit 130 as shown, or alternatively, on the scan module 120. Similarly, the guide track 110 is preferably connected to the base unit 130, and is extendable and retractable relative thereto.

Figure 2:
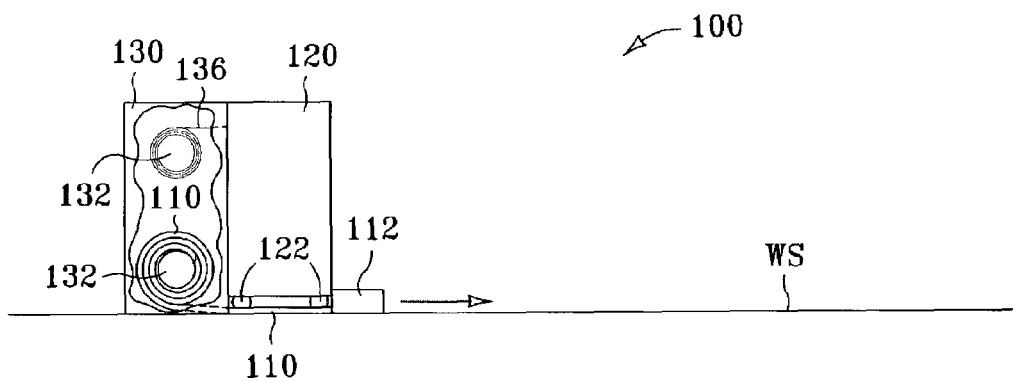
FIG. 2 is a side elevation view that depicts the scanning apparatus shown in FIG. 1 with the guide track retracted.

Turning now to FIG. 2, a side elevation view is shown which depicts the scanning apparatus that is depicted in FIG. 1. However, in FIG. 2 both the guide track 110 and the tether 136 are shown to be fully retracted. It is also noted that when the guide track 110 and the tether 136 are both fully retracted as shown, the scan module 120 is preferably adjacent to the base unit 130 as also shown.

With reference now to both FIGS. 1 and 2, the extendable and retractable nature of the guide track 110 can be facilitated by the employment a respective reel or spool 132 about which the guide track 110 can be coiled. That is, preferably, the guide track 110 is configured to be coiled so as to be extendable and retractable. In such a case, the guide track 110 is preferably flexible so as to facilitate coiling thereof. Preferably, the respective spool 132 about which the guide track 110 can be coiled is operatively supported on the base unit 130 as shown.

As further shown, a handle 112 can be included in the scanning apparatus 100 and can be connected to one end of the guide track 110 to facilitate manual extension of the guide track relative to the base unit 130. That is, the handle 112 can be employed by an operator of the apparatus 100 for manually extending and retracting the guide track 110 with respect to the base unit 130.

Preferably, the scan module 120 is self-propelled by way of a motive device such as a motor or the like (not shown) that is operatively supported on the scan module, and which is configured to impart motion to the scan module for the purpose of performing scanning functions. Thus, the scanning apparatus 100 is preferably configured so that power can be transmitted between the base unit 130 and the scan module 120, as the stationary base unit is most suitable to act as an interface between the scan module and a power source (not shown). The power that is conveyed from the base unit 130 to the scan module 120 to facilitate the operation thereof is preferably in the form of electrical power, although other forms of power can be utilized, such as compressed air and the like.

Figure 3:
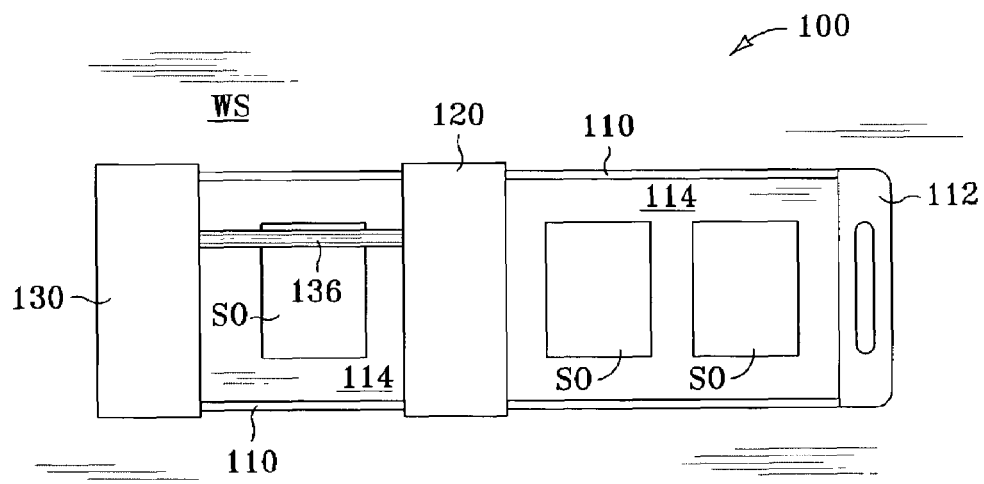
FIG. 3 is a top view that depicts the scanning apparatus shown in FIG. 1.

Turning now to FIG. 3, a top view is shown which depicts the scanning apparatus 100 which is depicted in FIG. 1. A close examination of FIG. 3 reveals that the scanning apparatus 100 preferably comprises a pair of parallel, spaced-apart, deployable guide tracks 110 which are configured to rest on the work surface WS. The external scan module 120 is preferably configured to move relative to the pair of guide tracks 110 and to perform scanning functions while guided by, and supported on and above, the pair of guide tracks.

The scanning apparatus 100 also preferably comprises a background surface 114 that is connected between the pair of guide tracks 110. More preferably, the background surface 114 is substantially opaque and reflective. Most preferably, the background surface 114 is white in color. The background surface 114 of the scanning apparatus 100 is also preferably flexible so as to be coiled about the respective spool 132 along with the guide track 110.

As is evident from a study of FIG. 3, the scanning apparatus 100 can be placed onto and supported by, the work surface WS. The guide track 110 can be connected to the base unit 130 and can be extended there from by way of the handle 112, as mentioned above. Scannable objects SO, such as hard copy documents and/or drawings or the like, can be placed, face up, on the background surface 114 and between the pair of guide tracks 110 as shown. In the case wherein the scanning apparatus 100 does not include a background surface 114, the scannable objects SO can be placed, face up, between the pair of guide tracks 110 and directly onto the work surface WS.

A flexible, transparent cover (not shown) can be included in the scanning apparatus 100 and can be connected to one of the guide tracks 110. The scannable objects SO can be placed beneath the transparent cover prior to commencement of the scanning function. The transparent cover can thus facilitate scanning of the scannable objects SO by serving to hold the scannable objects against the background surface 114, or against the work surface WS in the case wherein the background surface is not included.

The scan module 120 can then be caused to move while guided by the guide track 110 so as to optically scan the scannable objects SO while moving over them. That is, the scan module 120 is caused to move along the guide track 110 and over the scannable objects SO to thereby scan the scannable objects. The actual scanning process, as well as the related control schemes required to perform a scanning function are known in the art and, therefore, shall not be discussed in detail herein.

Figure 4:
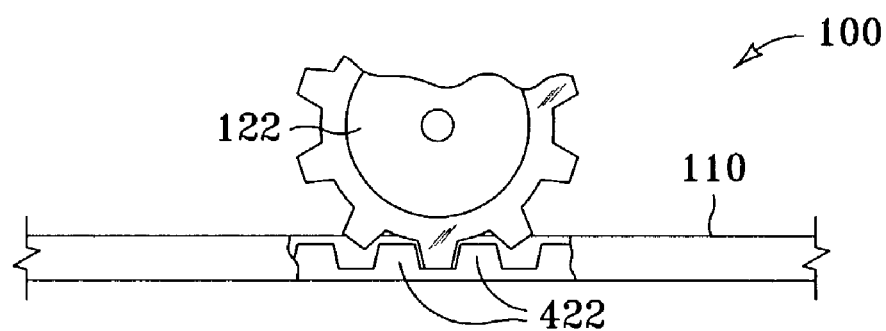
FIG. 4 is a partial side elevation cutaway view that depicts one possible configuration of the guide track of the scanning apparatus shown in FIG. 1.

Turning now to FIG. 4, a partial side cutaway view is shown which depicts an alternative configuration of the roller 122 and guide track 110 of the scanning apparatus 100 which is depicted in FIGS. 1 through 3 and discussed above. As is evident from a study of FIG. 4, the guide track 110 can comprise a plurality of cogs 422. Similarly, the roller 122 can be configured as a cogged roller as shown so as to mesh with the plurality of cogs 422.

The cogs 422 are preferably configured to facilitate traction of the roller 122 in the case wherein the roller is configured as a cogged roller. The cogs 422 can also serve as a positional reference for the scan module 120 (shown in FIGS. 1 through 3) relative to the guide track 110. For example, if the drive roller 122 is configured as a cogged roller as shown, and if the roller is driven by a stepper motor (not shown) that is controlled by a controller (not shown), then the controller can determine the precise location of the scan module relative to the guide track 110 by counting the revolutions of the roller relative to a known reference position.

Figure 5:
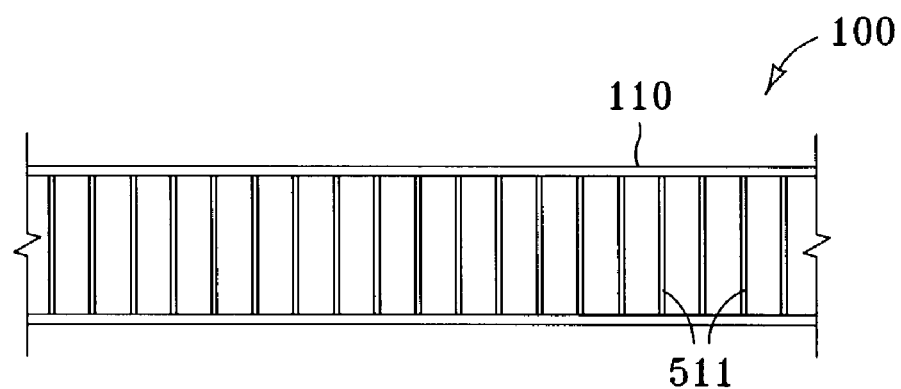
FIG. 5 is a top view that depicts another possible configuration of the guide track of the scanning apparatus shown in FIG. 1.

Turning now to FIG. 5, a partial top view is shown which depicts an alternative configuration of the guide track 110 of the scanning apparatus 100. As shown, the guide track 110 can comprise a series of optical markings 511 that are configured to serve as positional references which are utilized to determine the position of the scan module 120 (shown in FIGS. 1 through 3) relative to the guide track. That is, the scan module 120 can comprise an optical reader, or the like (not shown), that is configured to read the optical markings 511 as the scan module moves along the guide track.

The optical markings 511 can be configured to translate into a code that is decipherable by a controller or the like (not shown) to which the optical reader is communicatively connected. Such a code can thus be indicative of the position of the scan module 120 relative to the guide track 110. The optical reader can read the code and transmit the reading in the form of a data signal to the controller which can then read the data signal and determine the position of the scan module.

Figure 6:
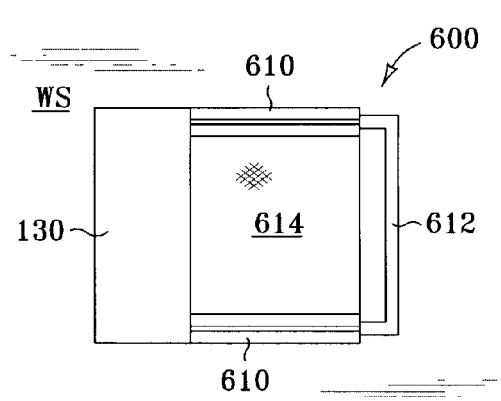
FIG. 6 is a top view that depicts a scanning apparatus in accordance with another embodiment of the present invention.

Turning now to FIG. 6, a top view is shown which depicts a scanning apparatus 600 in accordance with another embodiment of the present invention. The scanning apparatus 600 is configured to be supported on the work surface WS. The scanning apparatus 600 comprises a deployable guide track 610, and preferably comprises a pair of rigid, parallel, spaced-apart, deployable guide tracks 610 which are configured to be elevated so as to be supported above the work surface WS.

Preferably, the scanning apparatus 600 also comprises a substantially transparent platen 614 that is connected between the pair of guide tracks 610. The scanning apparatus 600 can also comprise a base unit 130 that is configured to rest on the work surface WS. The base unit 130 has been described above with reference to the apparatus 100. Preferably, the guide track 610 is connected to the base unit 130 and is extendable there from. A handle 612 can also be included in the scanning apparatus 600 to facilitate manual extension and retraction of the guide track 610.

Figure 7:
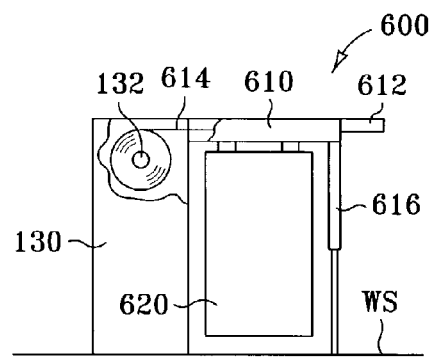
FIG. 7 is a side elevation view that depicts the scanning apparatus shown in FIG. 6.

Moving now to FIG. 7, a side elevation view is shown which depicts the scanning apparatus 600 depicted in FIG. 6. As is evident from a study of FIG. 7, the scanning apparatus 600 comprises an external scan module 620. The scan module 620 is configured to move relative to the guide track 610, and is further configured to perform scanning functions while guided by the guide track. As mentioned above, the guide track 610 is preferably configured so as to be substantially rigid in order to support the scanning module 620.

More specifically, the guide track 610 is preferably configured to be rigid so as to facilitate its elevated nature, wherein the guide track is supported above the work surface WS, while the scan module 620 is preferably configured to be suspended from, and below, the guide track as shown. As is further shown, a leg 616 can be included in the scanning apparatus 600, and can be connected to the guide track 610 to at least partially support the guide track above the work surface WS.

As is further evident from a study of FIG. 7, the transparent platen 614 of the scanning apparatus 600 can be deployable along with the guide track 610. More specifically, the transparent platen 614 can be extendable from the base unit 130 along with the guide track 610. One of the possible ways the transparent platen 614 can be made extendable from the base unit 130 is by employing a spool or reel 132 that is operatively supported on the base unit.

The transparent platen 614 can be configured to be somewhat flexible so as to be coiled about the spool 132 when retracted as shown. Accordingly, when the guide track 610 is deployed, or extended from the base unit 130, the transparent platen 614 is preferably correspondingly uncoiled from the spool 132. Although the platen 614 is preferably somewhat flexible so as to be coiled about the spool 132, the platen preferably has enough stiffness to support itself between the pair of guide tracks 610 as shown. The platen 614 is also preferably configured to support at least one scannable object SO such as a hard copy document or the like.

Figure 8:
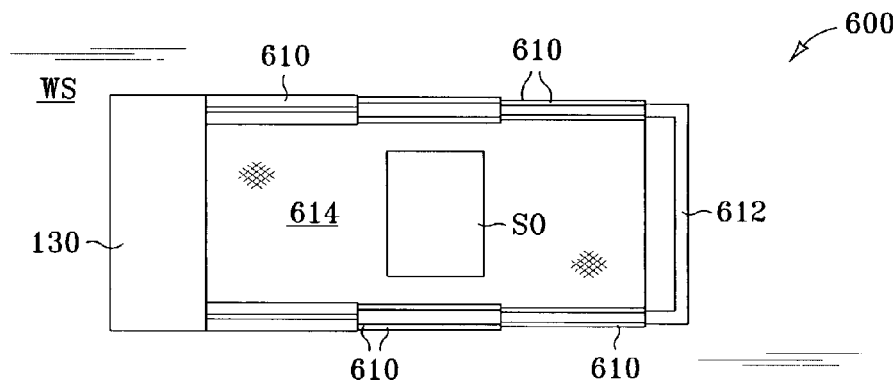
FIG. 8 is a top view that depicts the scanning apparatus shown in FIG. 6 with the guide track and the platen extended.

Moving now to FIG. 8, a top view is shown which depicts the scanning apparatus 600 that is shown in FIGS. 6 and 7, but with the guide track 610 and the platen 614 in the extended position. That is, as is seen from an examination of FIG. 8, the guide track 610, as well as the transparent platen 614 are shown to be extended, or deployed. More specifically, a study of FIG. 8 reveals that the guide track 610 of the scanning apparatus 600 is preferably telescopic, so as to be telescopically extendable. As is further apparent, the transparent platen 614 is also preferably extendable such that, when the guide track 610 is extended, the platen is also extended along with the guide track.

Figure 9:
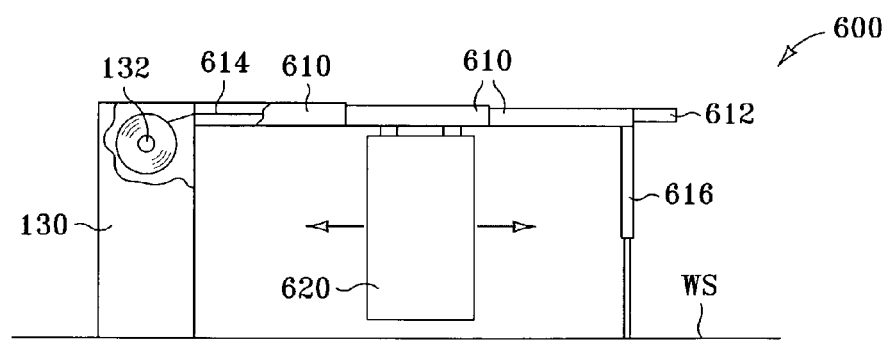
FIG. 9 is a side elevation view that depicts the scanning apparatus shown in FIG. 8.

As shown, a scannable object SO can be placed, face down, on the transparent platen 614 in preparation for scanning by the scanning apparatus 600. As explained above with respect to the apparatus 100, the scannable object SO can be, for example, a hard copy document or a drawing, or the like. Turning now to FIG. 9, a side elevation view is shown of the scanning apparatus 600 which is depicted in FIG. 8. As is seen, the deployment, or extension, of the guide track 610 allows the scan module 620 to be operatively suspended from the guide track, and further allows the scan module to move along the guide track while performing scanning functions. That is, as is evident from a study of both FIGS. 8 and 9, the scan module 620 is configured to move relative to the pair of guide tracks 610, and is further configured to perform scanning functions whiled guided by, and suspended from and below, the pair of guide tracks.

As is further evident from an examination of FIGS. 8 and 9, the scanning module 620 is configured to scan the scannable object SO from below and through the platen 614 upon which the scannable object is supported in a face down manner. The scanning apparatus 600 can include an opaque cover (not shown) that is configured to be placed over the scannable object SO and the platen 614 during scanning by the scannable object. Preferably, the bottom of such a cover is light-reflective, and is more preferably white in color. Such a cover can serve to enhance image quality and can provide other benefits as is described above with respect to the prior art. That is, such covers, along with the benefits thereof, are known in the art.

It is understood that the scanning apparatus 600, as well as other scanning apparatus described below in accordance with additional embodiments of the present invention, can include the various components described above with respect to the scanning apparatus 100 which is shown in FIGS. 1, 2, and 3. For example, the scanning apparatus 600 described above and shown in FIGS. 6 through 9 can incorporate a tether 136 (shown in FIGS. 1 and 3) as a means of conveying power and/or data signals between the scan module 620 and the base unit 130. Additionally, the guide track 610 of the scanning apparatus 600 can be configured to convey power and/or data signals in the manner of the guide track 110 as described above with respect to the scanning apparatus 100.

Figure 10:
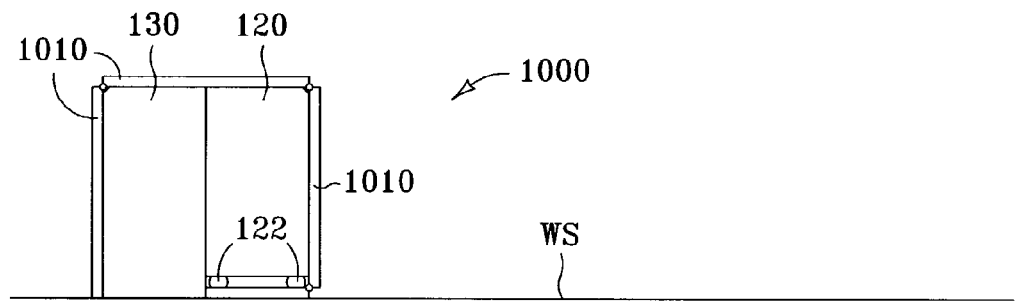
FIG. 10 is a side elevation view that depicts a scanning apparatus in accordance with yet another embodiment of the present invention.

Turning now to FIG. 10, a side elevation view is shown which depicts a scanning apparatus 1000 in accordance with yet another embodiment of the instant invention. The scanning apparatus 1000 is preferably configured to rest on the work surface WS. The scanning apparatus 1000 preferably includes a deployable guide track 1010 and an external scan module 120 that is configured to move relative to the guide track, and further configured to perform scanning functions while guided by the guide track. The scanning apparatus 1000 can be very similar in configuration to the scanning apparatus 100 which is described above and shown in FIGS. 1, 2, and 3, with the exception of the configuration of the deployable track, as will become more apparent in later discussion.

Preferably, the scanning apparatus 1000 also comprises a base unit 130. The base unit 130, as well as the scan module 120, has been described above with respect to the scanning apparatus 100. The guide track 1010 is preferably connected to the base unit 130 and is preferably extendable there from. As shown, the scanning apparatus can include at least one roller 122 that is functionally mounted on the scan module and is configured to allow the scan module to move relative to the guide track 1010 when the guide track is deployed, or extended. The roller 122 has been described above with respect to the scanning apparatus 100.

Figure 11:
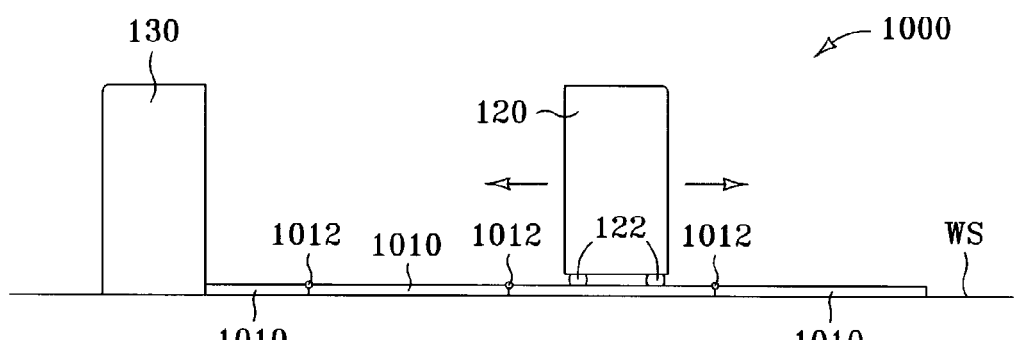
FIG. 11 is a side elevation view that depicts the scanning apparatus of FIG. 10 with the guide track deployed.

Moving now to FIG. 11, a side elevation view is shown which depicts the scanning apparatus 1000 that is shown in FIG. 10. As is evident from a study of FIG. 11, the guide track 1010 is shown to have been extended, and shown resting on the work surface WS. More specifically, the guide track 1010 is shown to have been unfolded. That is, preferably, the guide track 1010 is configured to be foldable.

The guide track 1010 can be made foldable by way of, for example, hinge joints 1012 or the like. It is understood that the scanning apparatus 1000 can comprise a pair of parallel, spaced apart guide tracks 1010 in the manner of the guide tracks of the scanning apparatus 100 and 600 which are described above. Furthermore, it is understood that the scanning apparatus 1000 can include a background surface (not shown) connected between the pair of parallel guide tracks 1010 in the manner of the background surface 114 that is included in the scanning apparatus 100 which is described above.

A scannable object (not shown) can be placed, face up, either on the work surface WS or on the background surface if the scanning apparatus 1000 is so configured. The scan module 120 can then be caused to pass over and scan the scannable object while guided by the guide track 1010 as in the manner of the apparatus 100 described above.

As mentioned above, it is understood that the scanning apparatus 1000 can incorporate any of the various features and components described above with respect to the scanning apparatus 100. For example, the guide track 1010 of the apparatus 1000 can be configured to convey power and or data signals between the base unit 130 and the scan module 120. Furthermore, the scanning apparatus 1000 can incorporate a retractable tether (not shown) to convey power and/or data signals between the base unit 130 and the scan module 120.

However, still other means can be employed for conveying data signals and/or power between the base unit 120 and the scan module 130. For example, turning now to FIG. 12, a side elevation view is shown which depicts a scanning apparatus 1200 in accordance with still another embodiment of the present invention. The scanning apparatus 1200 comprises a deployable guide track 1210, and an external scan module 120 that is configured to move relative to the guide track, and is further configured to perform scanning functions while guided by the guide track.

The scanning apparatus 1200 also preferably includes a base unit 130. The scan module 120 and the base unit 130 have been described above with respect to the scanning apparatus 100. The scanning apparatus 1200 can be configured in a manner similar to that of the scanning apparatus 100 described above, with the exception of the manner in which data signals and/or power is conveyed between the scan module 120 and the base unit 130. Another difference between the scanning apparatus 1200 and the scanning apparatus 100 is that of the configuration of the guide track 1210, as will become more apparent in later discussion.

Figure 12:
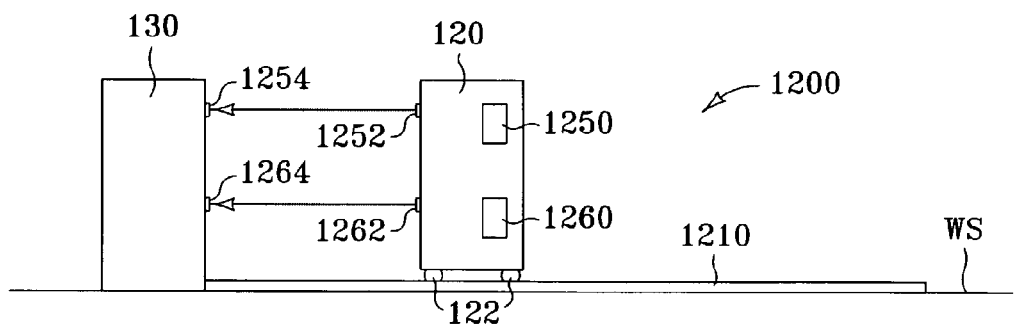
FIG. 12 is a side elevation view that depicts a scanning apparatus in accordance with still another embodiment of the present invention.

Still referring to FIG. 12, the scanning apparatus 1200 preferably comprises a data memory device 1250 that is operationally supported on the scan module 120. The data memory device 1250 can be a known memory device such as a memory chip or the like. The data memory device 1250 is configured to store data therein, wherein the data is developed as the result of scanning processes performed by the scan module 120. In other words, when the scan module 120 performs a scanning operation, or scans, a scannable object (not shown), the data generated, or developed, from the scanning operation, and which is representative of the scanned object, is then preferably stored in the data memory device 1250. Preferably, the data memory device 1250 is capable of storing therein the scan data of at least one page of a complex document or drawing.

As is further shown, the scanning apparatus 1200 also preferably comprises a scan module data connector portion 1252 and a base unit data connector portion 1254. Preferably, the scan module data connector portion 1252 is supported on the scan module 120, while the base unit data connector portion 1254 is preferably supported on the base unit 130, as shown.

The scan module data connector portion 1252 and the base unit data connector portion 1254 are configured to be connected together to facilitate data signal transmission between the base unit 130 and the data storage device 1250 when the scan module is docked at the base unit. That is the scan module 120 is configured to move toward the base unit 130 so as to dock therewith, wherein the scan module data connector portion 1252 and the base unit connector portion 1254 are connected to one another so as to transmit data signals between the data storage device 1250 and the base unit 130 when such docking occurs.

Similarly, the scanning apparatus 1200 preferably comprises a rechargeable electrical power storage device 1260, such as a battery or the like, that is operatively supported on the scan module 120, whereby the electrical power storage device is capable of supplying operational power to the scan module. That is the electrical power storage device 1260 is configured to store electrical power therein to facilitate operation of the scan module 120.

The scanning apparatus 1200 also preferably comprises a scan module power connector portion 1262 and a corresponding base unit power connector portion 1264. Preferably, when the scan module 120 docks at the base unit 130 as described above, the scan module power connector portion 1262 and the base unit power connector portion 1264 are automatically connected together to facilitate power transmission between the base unit and the power storage device to facilitate recharging thereof.

It is understood that various portions, features, and elements of the above-described embodiments of the present invention can be combined in manners not specifically shown or described herein to result in additional embodiments in accordance with the present invention. For example, by combining various, selected features and elements of the apparatus 100 and 600, which are described above and shown in FIGS. 1 and 9, respectively, an additional apparatus in accordance with the present invention can be developed.

Specifically, for example, an additional apparatus (not shown) can incorporate the base unit 130 and scan module 120 of the apparatus 100. Additionally, the guide track 110 of the apparatus 100 can be omitted therefrom, whereby the rollers 122 are configured to be operatively supported directly upon the work surface WS. In such a case, the rollers 122 preferably comprise a suitable traction surface such as urethane or the like to facilitate operative traction with the work surface WS.

Additionally, such an alternative embodiment can include an elevated, and preferably telescopic, guide track in the manner of the guide track 610 of the apparatus 600. In this manner, the scan module 120 can be configured to be supported directly on the work surface WS, while being guided by an elevated guide track such as the guide track 610. Such an elevated guide track can be configured to provide transmission of data signals and power between the base unit 130 and the scan module.

While the above invention has been described in language more or less specific as to structural and methodical features, it is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A scanning apparatus, comprising: a deployable guide track; and, an external scan module configured to move relative to the guide track, and further configured to perform scanning functions while guided by the guide track, and wherein the guide track is connected to a base unit and is extendable and retractable relative thereto.

2. The scanning apparatus of claim 1, and wherein the guide track is coilable.

3. The scanning apparatus of claim 1, and wherein the guide track is foldable.

4. The scanning apparatus of claim 1, and wherein the guide track is telescopic.

5. The scanning apparatus of claim 1, and wherein: the guide track is substantially rigid, whereby the scan module is supportable thereby; and, the scan module is operatively suspendable from, and below, the guide track.

6. The scanning apparatus of claim 1, and wherein the scan module is operatively supportable on, and above, the guide track.

7. The scanning apparatus of claim 1, and wherein the guide track is operatively connected in power-transmitting linkage between the base unit and the scan module, thereby facilitating power transmission there between.

8. The scanning apparatus of claim 1, and wherein the guide track is operatively connected in data signal transmitting linkage between the base unit and the scan module, thereby facilitating data signal transmission there between.

9. The scanning apparatus of claim 1, wherein the guide track comprises a series of optical markings that are readable by the scan module and thereby serve as positional references which are utilized to determine the position of the scan module relative to the guide track.

10. The scanning apparatus of claim 1, wherein the guide track comprises a plurality of cogs that are meshingly engagable by the scan module and that facilitate traction of the scan module relative to the guide track.

11. The scanning apparatus of claim 1, and further comprising a retractable tether connected between a base unit and the scan module, wherein the tether facilitates transmission of data signals between the scan module and the base unit.

12. The scanning apparatus of claim 1, and further comprising a retractable tether connected between a base unit and the scan module, wherein the tether facilitates transmission of electrical power between the scan module and the base unit.

13. The scanning apparatus of claim 1, and further comprising: a data memory device operatively supported by the scan module and configured to store data therein, which data is developed as a result of scanning processes performed by the scan module; and, a data docking port comprising a scan module data connector portion supported on the scan module, and a corresponding base unit data connector portion supported by a base unit, wherein the scan module is dockable at the base unit, and wherein the scan module data connector portion and the base unit data connector portion are thereby connectable together in facilitation of data transmission between the data memory device and the base unit.

14. The scanning apparatus of claim 1, and further comprising: a rechargeable electrical power storage device operatively supported on the scan module, whereby electrical power is storable therein in facilitation of scan module operation; and, a power docking port comprising a scan module power connector portion supported by the scan module, and a corresponding base unit power connector portion supported by a base unit, wherein the scan module is dockable at the base unit, and wherein the scan module power connector portion and the base unit power connector portion are thereby connectable together in facilitation of power transmission between the base unit and the power storage device, in furtherance of recharging thereof.

15. A scanning apparatus configured to be supported on a work surface, the apparatus comprising: a pair of parallel, spaced-apart, deployable guide tracks supportable on the work surface; an external scan module that is movable relative to the pair of guide tracks, and capable of performing scanning functions while guided by, and supported on and above, the pair of guide tracks;

a substantially opaque, reflective background surface connected between the pair of guide tracks.

16. The scanning apparatus of claim 15, and further comprising a base unit to which the guide tracks and the background surface are extendably connected, and which serves as a power and signal interface relative to the scan module.

17. A scanning apparatus supportable on a work surface, the apparatus comprising: a pair of rigid, parallel, spaced-apart, deployable guide tracks elevated above the work surface; an external scan module movable relative to the pair of guide tracks, and capable of performing scanning functions while guided by, and suspended from and below, the pair of guide tracks, and further comprising a substantially transparent platen connected between the pair of guide tracks.

18. The scanning apparatus of claim 17, and further comprising a base unit to which the guide tracks and the platen are extendably connected, and which serves as a power and signal interface relative to the scan module.

* * * * *